(12) United States Patent
Tewinkle

(10) Patent No.: US 8,520,044 B2
(45) Date of Patent: Aug. 27, 2013

(54) LED PRINT-HEAD DRIVER WITH INTEGRATED PROCESS DIRECTION COMPENSATION

(75) Inventor: Scott L. Tewinkle, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 41 days.

(21) Appl. No.: 13/157,945

(22) Filed: Jun. 10, 2011

(65) Prior Publication Data

US 2012/0314014 A1    Dec. 13, 2012

(51) Int. Cl.
     *B41J 2/45*          (2006.01)
(52) U.S. Cl.
     USPC ........................................................ 347/238
(58) Field of Classification Search
     USPC .................. 347/229, 234, 235, 238, 248–250
     See application file for complete search history.

(56) References Cited

U.S. PATENT DOCUMENTS

| | | | |
|---|---|---|---|
| 6,172,701 B1 | 1/2001 | Tokura | |
| 6,215,511 B1 * | 4/2001 | Asako et al. ................... | 347/234 |
| 7,142,227 B2 * | 11/2006 | Omae ........................... | 347/132 |
| 7,834,898 B2 * | 11/2010 | Yamaguchi et al. ........... | 347/234 |
| 8,279,247 B2 * | 10/2012 | Kadowaki ..................... | 347/116 |
| 2009/0096493 A1 | 4/2009 | Nagumo | |

OTHER PUBLICATIONS

U.S. Appl. No. 12/858,753, Unpublished, TeWinkle.

* cited by examiner

*Primary Examiner* — Hai C Pham
(74) *Attorney, Agent, or Firm* — Simpson & Simpson, PLLC

(57) ABSTRACT

A light emitting diode (LED) print head arranged to receive a set of raw print data. The print head includes a plurality of LED array chips each having a plurality of LEDs, wherein each LED of the plurality of LEDs includes a process direction position. The print head further includes at least one matrix drive circuit arranged to control activation of the plurality of LEDs in response to the set of raw print data and at least one real-time print data compensation circuit, wherein the at least one real-time print data compensation circuit receives the set of raw print data and delays transmitting the set of raw print data to the at least one matrix drive circuit based on a relative relationship between the process direction position of each LED.

10 Claims, 14 Drawing Sheets

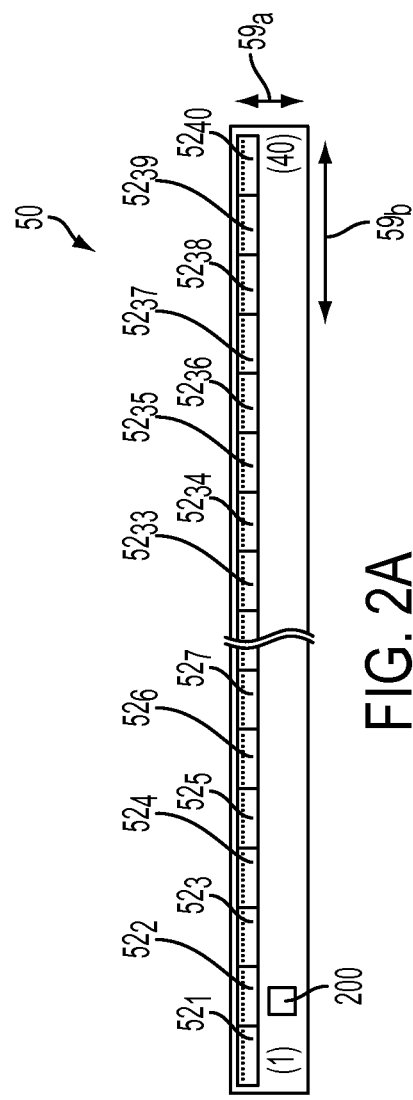

LED PRINT-HEAD DRIVER WITH INTEGRATED PROCESS DIRECTION COMPENSATION

INCORPORATION BY REFERENCE

The following co-pending applications are incorporated herein by reference in their entireties: U.S. patent application Ser. Nos. 12/232,220, filed on Sep. 12, 2008 and 12/858,753, filed on Aug. 18, 2010. The following patent is incorporated herein by reference in its entirety: U.S. Pat. No. 6,172,701, issued on Jan. 9, 2001.

TECHNICAL FIELD

The presently disclosed embodiments are directed to providing high resolution light emitting diode (LED) print-heads (LPH).

BACKGROUND

FIG. 1 schematically shows prior art image recording apparatus 20 with light-emitting diode (LED) printbar 21. It should be appreciated that an LED printbar may also be referred to as an LED printhead (LPH). Printbar 21 is an example of an LED full width array imager. An LED full width array imager consists of an arrangement of a large number of closely spaced LEDs in a linear array. By providing relative motion between the LED printbar and a photoreceptor in a process direction, and by selectively energizing the LEDs at the proper times in a scan direction, a desired latent electrostatic image can be produced on the recording member. The production of a desired latent image is usually performed by having each LED expose a corresponding pixel on the recording member in accordance with image-defining video data information applied to the printbar through driver circuitry. Conventionally, digital data signals from a data source, which may be a Raster Input Scanner (RIS), a computer, a word processor or some other source of digitized image data is clocked into a shift register. Some time after the start of a line signal, individual LED drive circuits are then selectively energized to control the on/off timing of currents flowing through the LEDs. The LEDs selectively turn on and off at fixed intervals to form a line exposure pattern on the surface of the photoreceptor. A complete image is formed by successive line exposures.

The following provides further detail regarding prior art apparatus 20. Printbar 21 includes: LED's controlled according to recording signals supplied from an unrepresented external device; a rotary drum 22 provided with a photoreceptor along the periphery thereof; a rod lens array 23 for focusing the light beams of the LEDs in the printing head 21 onto the photoreceptor surface of the drum 22; a corona charger 24 for charging the photoreceptor in advance; a developing station 25 for developing an electrostatic latent image with toner; a recording sheet 26; a cassette 27 housing a plurality of recording sheets 26; a feed roller 28 for feeding the recording sheet 26 from the cassette 27; registration rollers 29 for matching the front end of the recording sheet with the leading end of the image formed on the drum 22; a transfer charger 30 for transferring the developed image from the drum 22 onto the recording sheet 26; a separating roller 31 for separating the recording sheet from the drum 22; a belt 32 for transporting the recording sheet; fixing rollers 33; discharge rollers 34 for discharging the recording sheet onto a tray 35; a blade cleaner 36 for removing the toner remaining on the drum 22; a container 37 for the recovered toner; and a lamp 38 for eliminating charge remaining on the drum 22.

An LED print-head (LPH), e.g., LPH 50, is built by assembling a number of LED array chips end-to-end, e.g., LED array chips $52_1$ through $52_{40}$. For example, a 1200 dots per inch (dpi) A3 sized print-head could be constructed by assembling forty (40) individual LED array chips each having three hundred eighty four (384) LEDs, or fifteen thousand three hundred sixty (15,360) total LEDs across the entire LPH, as shown in FIG. 2A. Typically this type of print-head is driven with a ⅛th matrix drive circuit, e.g., matrix drive circuits $54_1$ through $54_{48}$, (See U.S. Pat. No. 6,172,701) and has an LED arrangement as shown in FIG. 2B through 2D. It should be appreciated that the foregoing arrangement includes a single shift register, i.e., shift register 56, which loads print data into the entire LPH and results in all LEDs within the LPH firing within eight actuations of the strobe. Thus, for example, LED 58a of LED array chip $52_1$ simultaneously fires as all other LEDs 58a on all other LED array chips $52_2$ through $52_{40}$ fire. Similarly, all LEDs 58b, 58c, 58d, 58e, 58f, 58g, 58h collectively as groups simultaneously fire on all LED array chips $52_1$ through $52_{40}$.

Ideally, the process direction profile of the LEDs of the print-head would be flat, i.e., there is no process direction profile in the scan direction; however, this arrangement does not occur as it is not possible to manufacture LED array chips in such a fashion. It should be appreciated that as used herein, the process direction is represented by bi-directional arrow 59a while the scan direction is represented by bi-directional arrow 59b. As array chips $52_1$ through $52_{40}$ are positioned end-to-end, a true straight line is not formed thereby resulting in process direction profile errors. The measured process direction profile of a typical print-head of the type shown in FIG. 2A is provided in FIG. 3A. It has a process direction profile range of 106 μm (+80 μm to −26 μm) across the length of the LPH. Alternately, a chip averaged process direction profile of FIG. 3A, is shown in FIG. 3B, and has a range of 88 μm (+69 μm to −19 μm). It should be appreciated that the "chip average" is the average process direction position of all LEDs within a discreet LED array chip. A typical specification range for the measured process direction profile is 100 μm, which is approximately equal to five lines of correction for a 1200 dpi×1200 dpi printing system.

For a 1200 dpi×1200 dpi printing system, the process direction profile range of a typical LPH represents a misalignment of about five scan lines in a printed image, while for a 1200 dpi×2400 dpi system it represents a misalignment of about eight scan-lines. It should be appreciated that the foregoing misalignments are based on the physical location of the LEDs and are therefore present in a printed image if a method of process direction profile compensation is not implemented. Moreover, the misalignment is further increased based on the fact that between the time that the first LED on a chip is activated and the last LED on that chip is activated, the print media, e.g., toner drum, sheet, image bearing belt, etc., has traveled in the process direction a particular distance based on the media's travel speed.

Thus, the process direction profile of an LED print-head impacts the image quality of a printer unless a method of compensation is implemented with the print controller. Although use of the print controller improves image quality, such use is quite complex and results in significant processing overhead which may then impact print speed. In known systems, the print controller variably delays the print data in the scan direction in order to minimize the misalignment, i.e., to compensate for the LPH process direction profile. For a ⅛th matrix driven LPH with print controller process direction profile compensation, the effective process direction profile range can be reduced to approximately one scan-line. Although this is a significant improvement, the improvement is provided at the expense of processing overhead and complexity.

The present disclosure addresses a system and method for compensating for LED print-head process direction profile variability.

SUMMARY

Broadly, the apparatus discussed infra provides an LED driver chip with configurable print delay that compensates for process direction profile variability of an LED print-head. The present apparatus provides improved image quality without additional overhead or complexity to the printer controller by the addition of various circuits within the data path, which circuits create variable print delays based on the characteristics of the LPH. The present disclosure proposes two embodiments that integrate the process direction profile compensation into the LED driver chips of the print-head, thereby eliminating the need to perform the compensation via the print controller. Each of the embodiments increases the use of the existing compensation memory of an LED print-head to provide additional information to the LED driver chips, thereby enabling the driver chips to perform "line" and "sub-line" process direction profile compensation. In other words, print delay values for the various LED array chips are loaded into memory, typically resident on the LED driver chip, wherein such delay values control where within a chain of shift registers print data is loaded. Thus, the present embodiments determine how many lines of delay are necessary and subsequently load the print data into the various shift registers corresponding to the necessary lines of delay.

According to aspects illustrated herein, there is provided an apparatus for providing "line" compensation which reduces the effective process direction profile to less than or equal to one scan-line, i.e., the same improvement obtained with print controller based compensation but without the processing overhead. While according to other aspects illustrated herein, there is provided an apparatus for providing "sub-line" compensation which further reduces the effective process direction profile of the print-head to ⅛th of the process direction resolution thereby resulting in an additional eight times (8×) improvement without any additional processing overhead. Such apparatus includes a light emitting diode (LED) print head arranged to receive a set of raw print data. The print head includes a plurality of LED array chips each having a plurality of LEDs, wherein each LED of the plurality of LEDs includes a process direction position. The LED print head further includes at least one matrix drive circuit arranged to control activation of the plurality of LEDs in response to the set of raw print data and at least one real-time print data compensation circuit, wherein the at least one real-time print data compensation circuit receives the set of raw print data and delays transmitting the set of raw print data to the at least one matrix drive circuit based on a relative relationship between the process direction position of each LED.

According to still other aspects illustrated herein, there is provided a method for calculating the necessary "line" and "sub-line" compensation values used by the present apparatus. Such method is a method for quantifying a process direction profile for a light emitting diode (LED) print head having a plurality of LED array chips, each LED array chip including a plurality of LEDs. The method includes: a) measuring a process direction profile value $Y(N, n)$ for each of the plurality of LEDs of each of the plurality of LED array chips, wherein N is a number associated with each of the plurality of LED array chips and n is a number associated with each of the plurality of LEDs; b) calculating an average process direction profile value $Y\_AVG(N)$ for each of the plurality of LED array chips; c) determining a maximum average process direction profile value $Y\_MAX$ from $Y\_AVG(N)$; d) calculating a line compensation value $L(N)$ for each of the plurality of LED array chips; and, e) storing each line compensation value $L(N)$ in a memory, wherein the LED print head includes the memory.

Other objects, features and advantages of one or more embodiments will be readily appreciable from the following detailed description and from the accompanying drawings and claims.

BRIEF DESCRIPTION OF THE DRAWINGS

Various embodiments are disclosed, by way of example only, with reference to the accompanying drawings in which corresponding reference symbols indicate corresponding parts, in which:

FIG. 2A is a top plan view of an LED print-head;

FIGS. 4A-1 and 4A-2 depict an embodiment of a real-time print data compensation circuit arranged to provide line compensation;

FIGS. 6A-1 and 6A-2 depict another embodiment of a real-time print data compensation circuit arranged to provide line and sub-line compensation;

DETAILED DESCRIPTION

Figure 1:
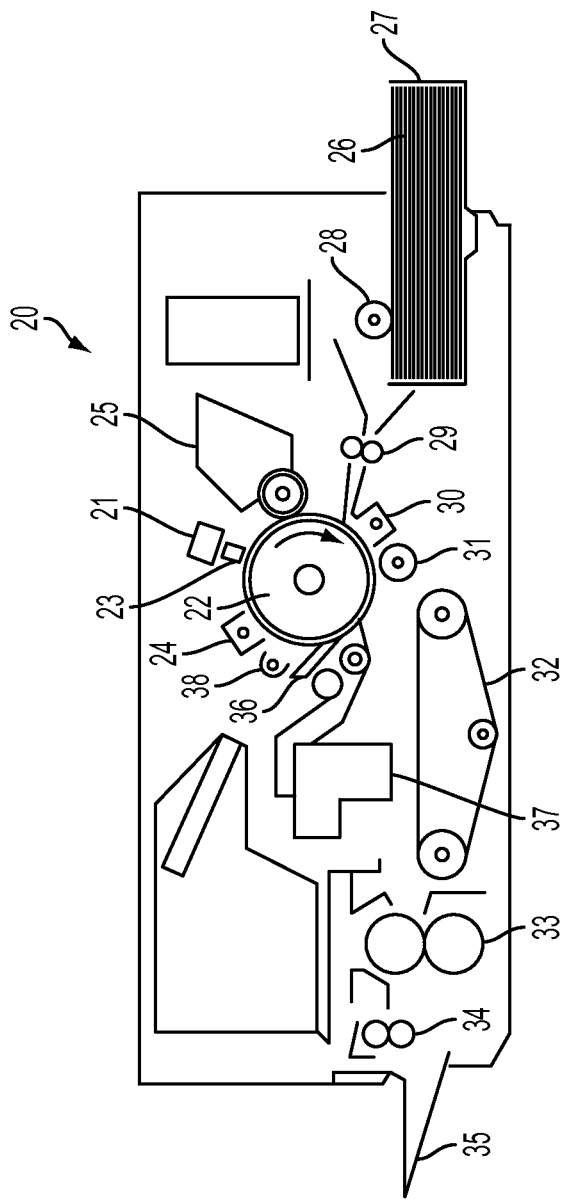
FIG. 1 schematically shows a prior art image recording apparatus with a light-emitting diode (LED) printbar

At the outset, it should be appreciated that like drawing numbers on different drawing views identify identical, or functionally similar, structural elements of the embodiments set forth herein. Furthermore, it is understood that these embodiments are not limited to the particular methodology, materials and modifications described and as such may, of course, vary. It is also understood that the terminology used herein is for the purpose of describing particular aspects only, and is not intended to limit the scope of the disclosed embodiments, which are limited only by the appended claims.

Unless defined otherwise, all technical and scientific terms used herein have the same meaning as commonly understood to one of ordinary skill in the art to which these embodiments belong. The words "printer," "printer system", "printing system", "printer device" and "printing device" as used herein encompasses any apparatus, such as a digital copier, bookmaking machine, facsimile machine, multi-function machine, etc. which performs a print outputting function for any purpose, while "multi-function device" and "MFD" as used herein is intended to mean a device which includes a plurality of different imaging devices, including but not limited to, a printer, a copier, a fax machine and/or a scanner, and may further provide a connection to a local area network, a wide area network, an Ethernet based network or the internet, either via a wired connection or a wireless connection. An MFD can further refer to any hardware that combines several functions in one unit. For example, MFDs may include but are not limited to a standalone printer, one or more personal computers, a standalone scanner, a mobile phone, an MP3 player, audio electronics, video electronics, GPS systems, televisions, recording and/or reproducing media or any other type of consumer or non-consumer analog and/or digital electronics. Additionally, as used herein, "sheet," "sheet of paper" and "paper" refer to, for example, paper, transparencies, parchment, film, fabric, plastic, photo-finishing papers or other coated or non-coated substrate media in the form of a web upon which information or markings can be visualized and/or reproduced. As used herein, the term 'average' shall be construed broadly to include any calculation in which a result datum or decision is obtained based on a plurality of input data, which can include but is not limited to, weighted averages, yes or no decisions based on rolling inputs, etc. Furthermore, as used herein, when referring to logical values, 0 and logical low are used interchangeably while 1 and logical high are also used interchangeably. Still yet further, as used herein, "real-time" is intended to mean data manipulation and/or compensation which occurs with little or no use of a processor, e.g., print controller processor, thereby resulting in efficient data manipulation and/or compensation without added processor overhead, such as delaying raw data transmission without any computational analysis of the same, while "raw data" and "raw print data" are intended to mean data which has not been modified from its original form and sequence, such as a single unmodified printer scan line of data. "Activation" of an LED, as used herein, is intended to mean either providing energy to an LED or not providing energy to an LED depending on whether image data is present at the particular location corresponding to that LED, i.e., in both the process and cross-process directions.

Moreover, although any methods, devices or materials similar or equivalent to those described herein can be used in the practice or testing of these embodiments, some embodiments of methods, devices, and materials are now described.

To address the issues described above, in an embodiment, the present apparatus includes a new LED matrix driver architecture that automatically compensates the process direction profile of an LPH to within one scan line while causing virtually no change to print controller processing overhead. Additionally, in an embodiment, the present apparatus includes a new LED matrix driver modified to further reduce the process direction profile to ⅛th of the resolution of a scan line, i.e., an eight times (8×) improvement in resolution compared with known device resolutions, while also causing virtually no change to print controller processing overhead.

Figure 2B:
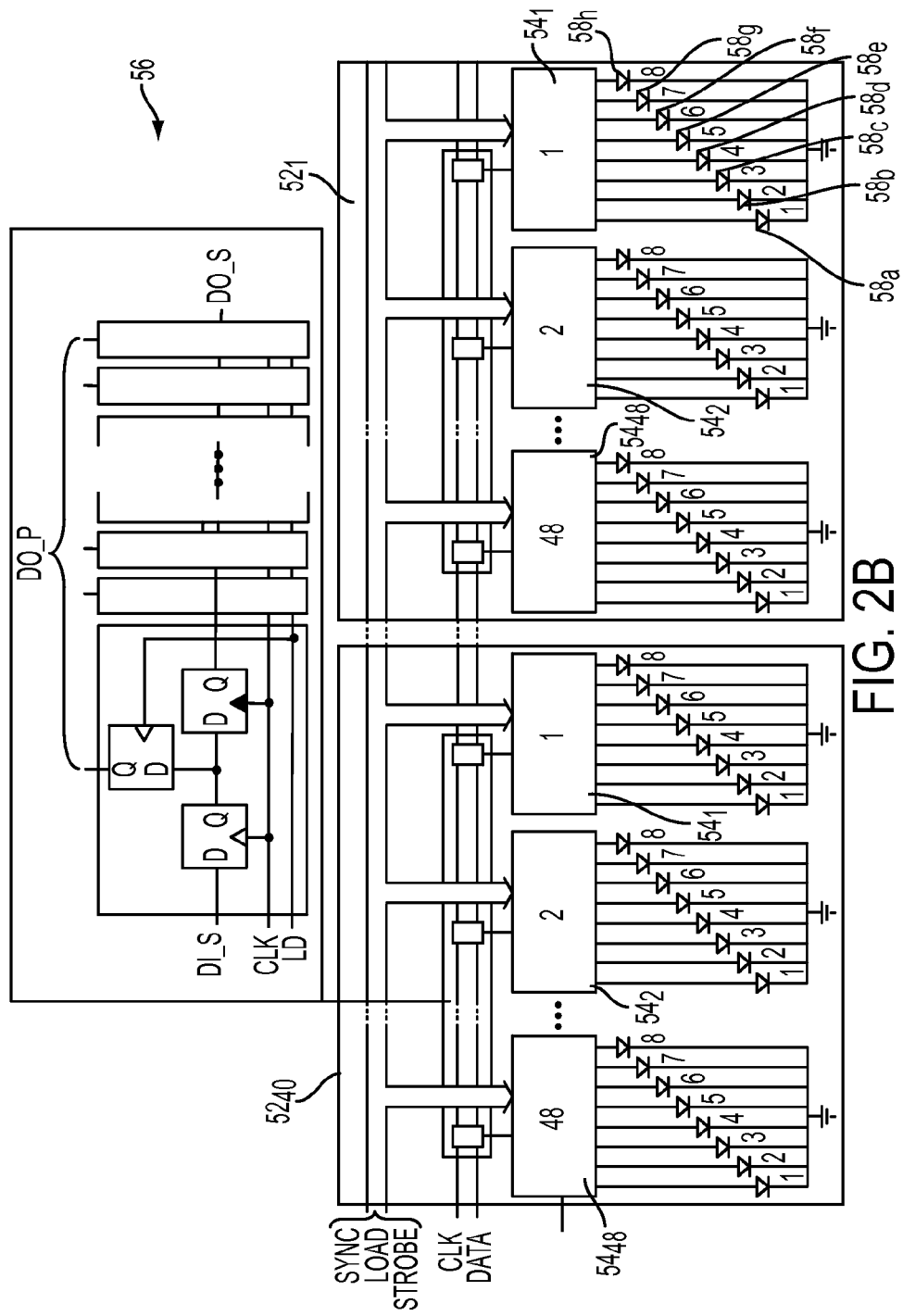
FIG. 2B is a schematic view of a portion of the LED print-head of FIG. 2A.
Figure 2C:
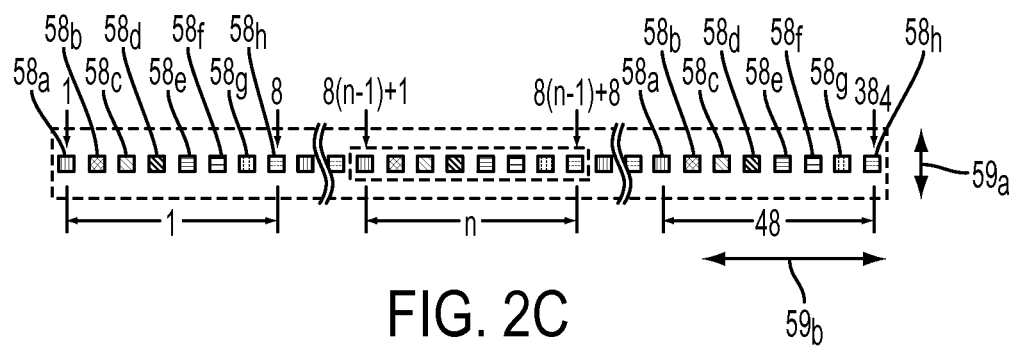
FIG. 2C is a schematic view of a portion of an LED array chip.
Figure 2D:
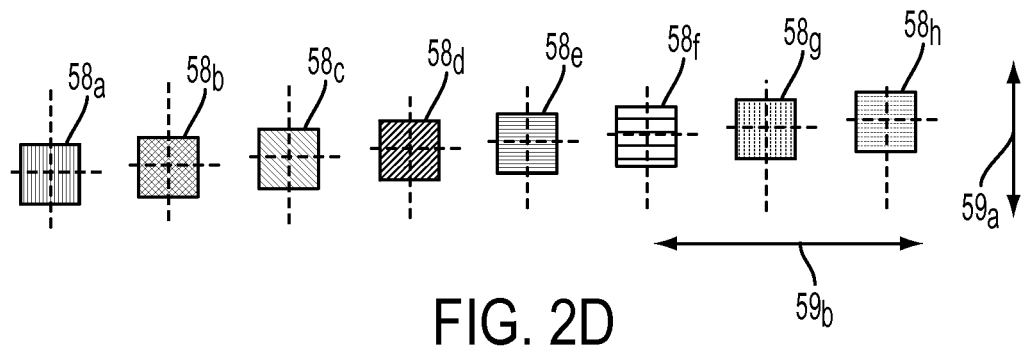
FIG. 2D is a schematic view of a portion of the LED array chip of FIG. 2C.
Figures 1, 4A:
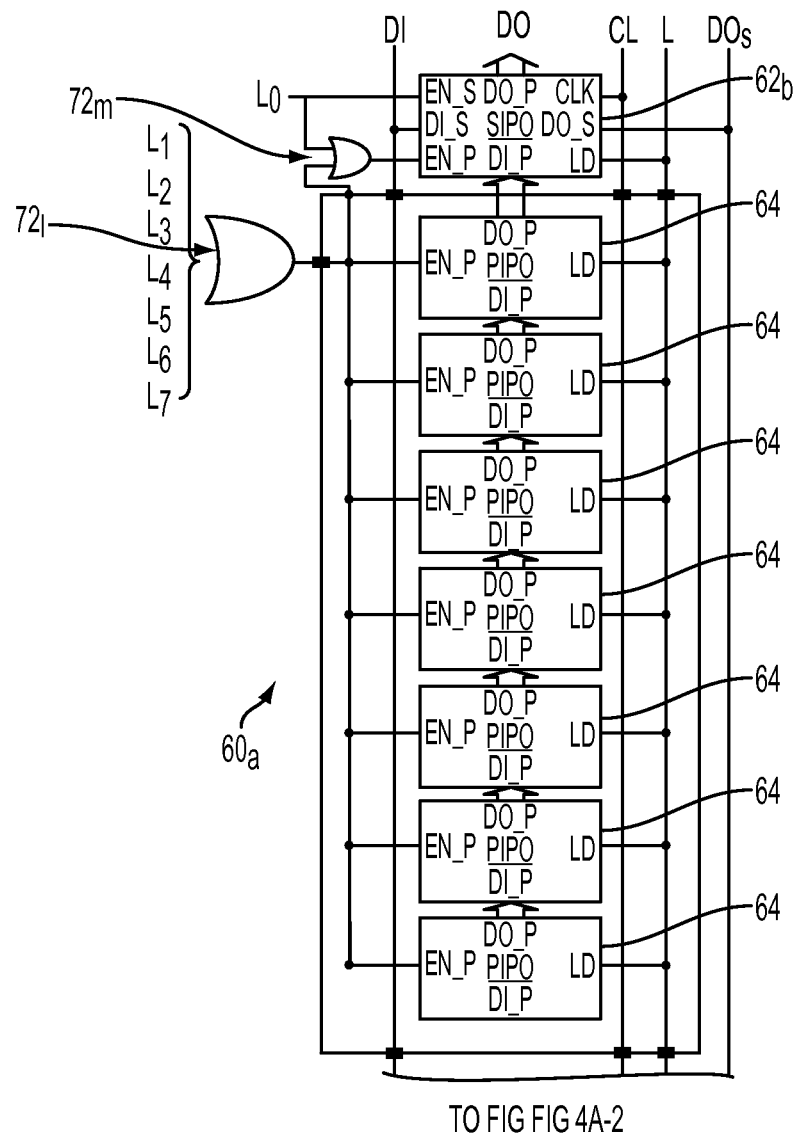
Figures 2, 4A:
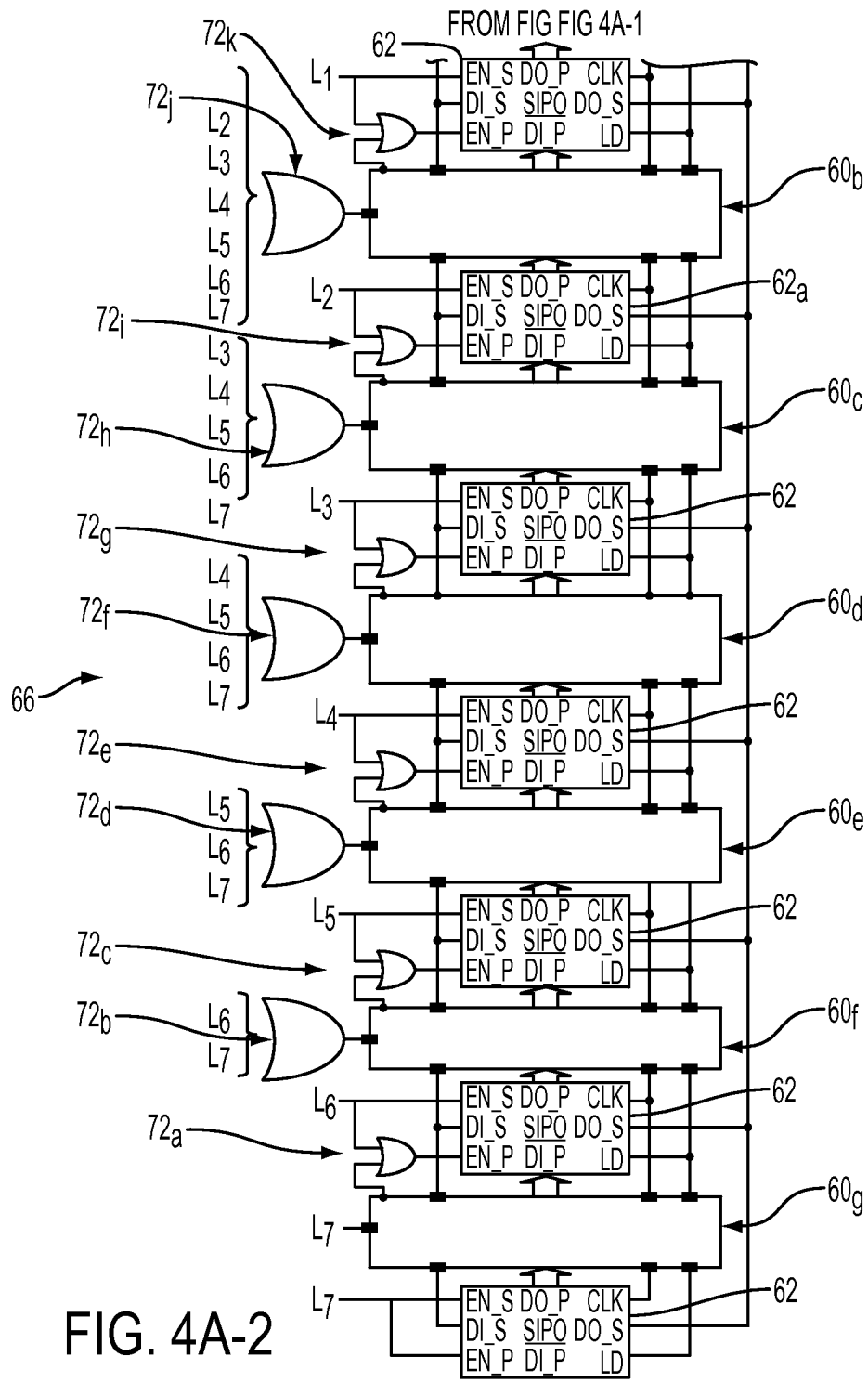
Figure 4B:
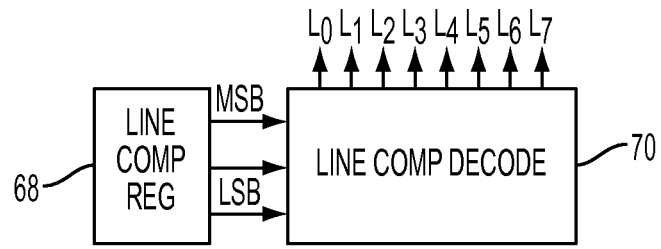
FIG. 4B is an embodiment of a line compensation register.

To implement the first embodiment, "serial-in-parallel-out" (SIPO) shift register 56 of LPH 50 (Fig. 2B) is replaced by combinations 60a through 60g of SIPOs and "parallel-in-parallel-out" PIPO shift registers, e.g., one SIPO 62 and seven PIPO shift registers 64, where there is one combination for each scan line of desired process direction profile compensation. Collectively, these combinations of SIPO shift registers and PIPO shift registers are referred to as "line" compensation shift register assembly 66. It should be appreciated that in the present embodiments, a shift register assembly 66 is associated with each discreet LED chip $52_1$ through $52_{40}$. It should be further appreciated that more or less than seven PIPO shift registers may be included depending on how many LEDs form an LED chip, e.g., if each LED chip is formed from ten LEDs then nine PIPO shift registers will be needed. Thus, the seven PIPO shift registers 64 of a combination, e.g., combination 60a, are required in order to retain the print data due to the sequential actuation of LEDs 58a through 58h via a matrix driver, e.g., matrix driver $54_1$. Since the typical specification of process direction profile range requires five scan-lines of compensation for 1200 dpi×1200 dpi and eight scan-lines of compensation for 1200 dpi×2400 dpi a practical quantity of shift register combinations is eight, as is shown in FIGS. 4A-1 and 4A-2. It should be further appreciated that more or less than eight shift register combinations may be used based on the number of lines of compensation which are needed, e.g., ten shift register combinations provide ten lines of compensation, and such variations are within the spirit and scope of the claims.

The print data is applied in parallel to the all SIPOs 62 of all combinations 60a through 60g but is only loaded into one of the SIPOs 62 based on the value of "line" compensation register 68. In this example, "line" compensation register 68 provides a 3-bit binary value including a most significant bit (MSB) and a least significant bit (LSB) to "line" compensation decoder 70, which in turn decodes the binary value and outputs logical values for $L_0$, $L_2$, $L_1$, $L_3$, $L_4$, $L_5$, $L_6$ and $L_7$. In other words, as shift register assembly 66 receives an input from compensation register 68 in accordance with Table 1 below, the respective SIPO shift register associated with desired amount of "line" compensation is enabled, thereby permitting the receipt of print data therein. For example, if two scan-lines of compensation are needed, $L_2$ is set to 1 (or logical high) while $L_0$, $L_1$, $L_3$, $L_4$, $L_5$, $L_6$ and $L_7$ are set to 0 (or logical low), thereby enabling serial data input (DI_S) of the SIPO shift register associated with $L_2$, i.e., SIPO shift register 62a. In other words, as print data is applied in parallel to all SIPO shift registers via line DI, the print data is only received by the enable SIPO shift register. Simultaneously, all SIPO shift registers and PIPO shift registers located above the enabled SIPO shift register have their respective parallel data inputs (DI_P) and parallel data outputs (DO_P) enabled, thereby permitting the parallel transfer of print data through shift register assembly 66 towards the parallel data output (DO_P) of the upper most SIPO shift register, i.e., SIPO shift register 62b. In the embodiment shown in FIGS. 4A-1 and 4A-2, the simultaneous enablement of the parallel data inputs occurs due to the arrangement of OR gates 72a through 72m and the output from "line" compensation register 68. For example, when two scan-lines of compensation are needed, OR gates 72i through 72m each output a 1 as each OR gate receives an input from $L_2$ or from a prior OR gate, e.g., OR gates 72j and 72L. Hence, all shift registers above and including SIPO shift register 62a are parallel enabled by the outputs of OR gates 72i through 72m. Load line (L) is connected to load data input (LD) of each SIPO shift register and PIPO shift register in shift register assembly 66. As the load line receives a rising signal, or is pulsed high, data is output from the enabled shift registers, while as the load line receives a falling signal, or is pulsed low, data is loaded into the enabled shift registers. It should be appreciated that the terms "above" and "upper most" are relative terms used with respect to FIGS. 4A-1 and 4A-2 and that the actual orientation of shift register assembly 66 may be different, e.g., horizontally arranged. Clock line CL receives a clock signal which is thereby provided to each of the SIPO shift registers, and causes print data in the serially enabled SIPO shift register to transfer out of that shift register via the serial data output (DO_S) to the serial data output line ($DO_S$). The serial data output line is arranged to pass print data from the shift register assembly of one LED chip to the shift register assembly of the next LED chip in sequence on the LPH.

TABLE 1

| | | Line Comp. Register MSB→LSB | | | | | | | |
|---|---|---|---|---|---|---|---|---|---|
| | L(N) | $L_0$ | $L_1$ | $L_2$ | $L_3$ | $L_4$ | $L_5$ | $L_6$ | $L_7$ |
| 000 | 0 | 1 | 0 | 0 | 0 | 0 | 0 | 0 | 0 |
| 001 | 1 | 0 | 1 | 0 | 0 | 0 | 0 | 0 | 0 |
| 010 | 2 | 0 | 0 | 1 | 0 | 0 | 0 | 0 | 0 |
| 011 | 3 | 0 | 0 | 0 | 1 | 0 | 0 | 0 | 0 |
| 100 | 4 | 0 | 0 | 0 | 0 | 1 | 0 | 0 | 0 |
| 101 | 5 | 0 | 0 | 0 | 0 | 0 | 1 | 0 | 0 |
| 110 | 6 | 0 | 0 | 0 | 0 | 0 | 0 | 1 | 0 |
| 111 | 7 | 0 | 0 | 0 | 0 | 0 | 0 | 0 | 1 |

Figure 3A:
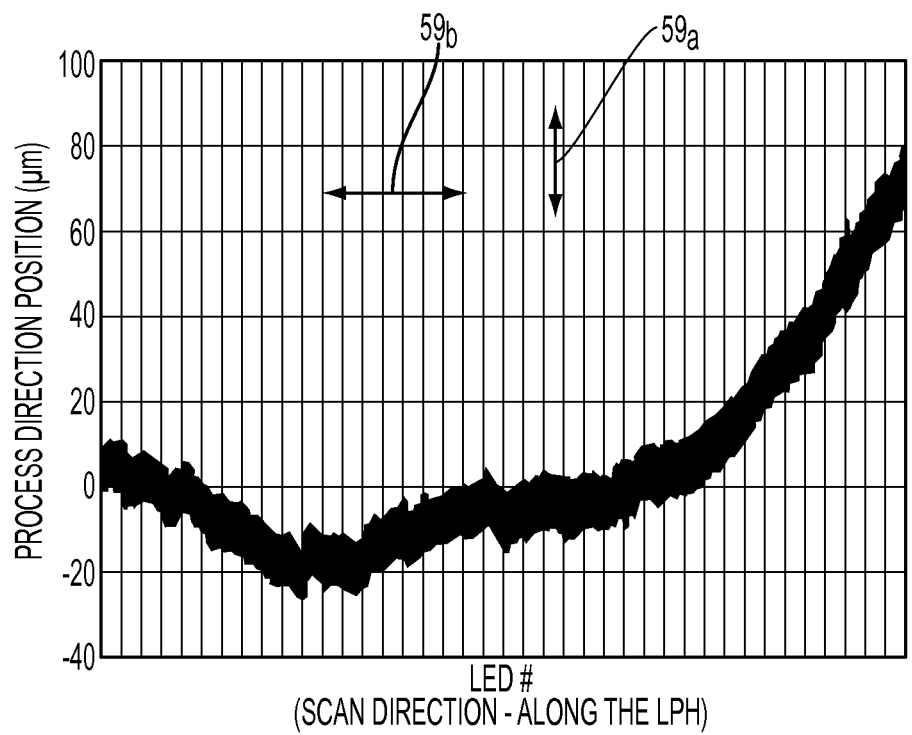
FIG. 3A is a graph depicting a typical process direction profile of an LED print-head.
Figure 3B:
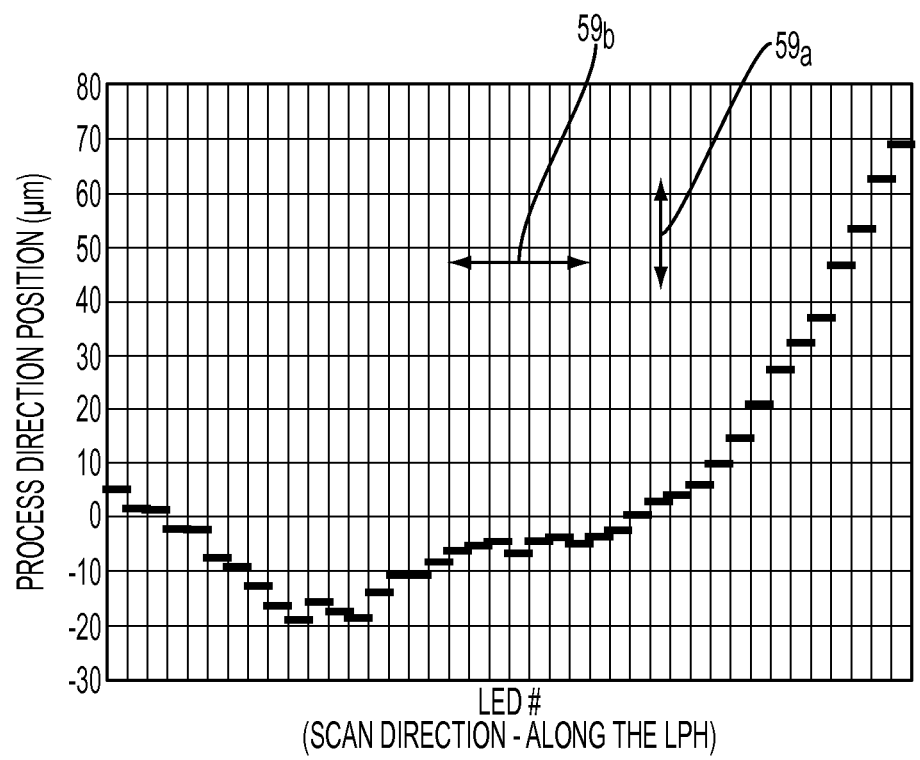
FIG. 3B is a graph depicting a typical chip averaged process direction profile of the process direction profile of FIG. 3A.
Figure 5:
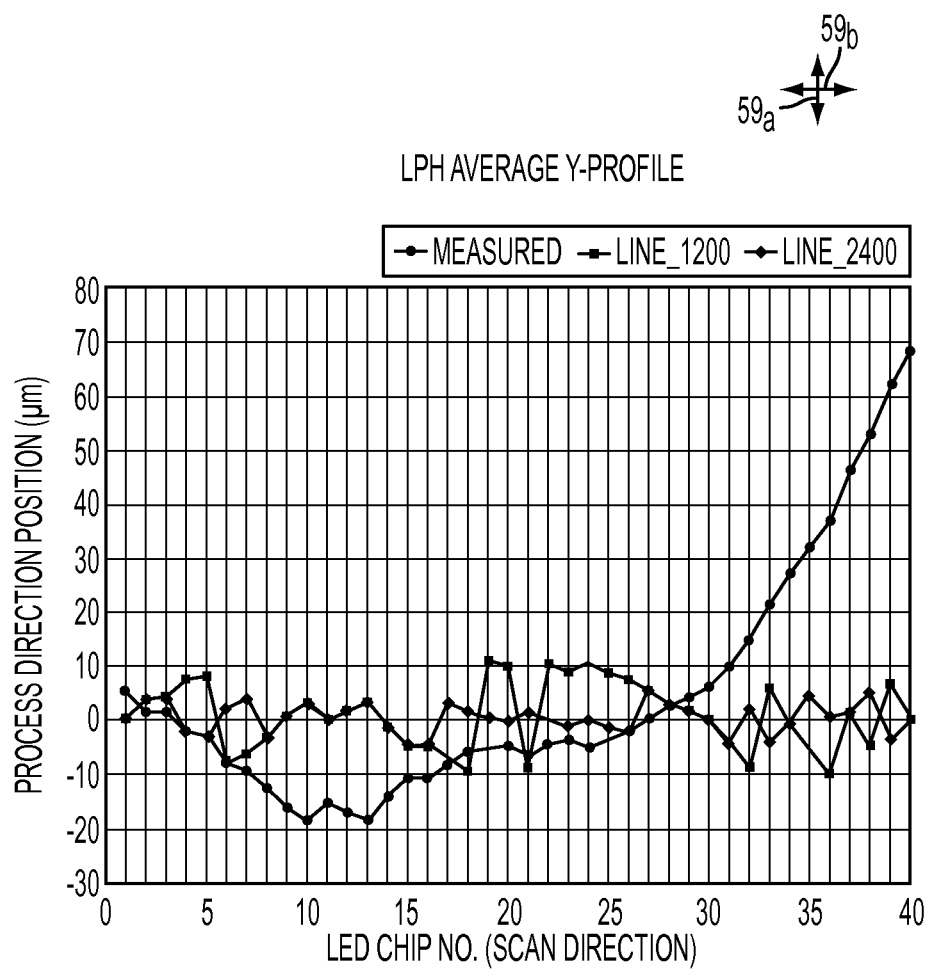
FIG. 5 is a graph depicting a typical chip averaged process direction profile of an LED print-head, a line compensated chip averaged process direction profile of a 1200 dpi LED print-head, and a line compensated chip averaged process direction profile of a 2400 dpi LED print-head.

The print data is moved by whole lines though the shift registers of shift register assembly 66. After the print data is serially loaded into the desired SIPO shift register, i.e., shift register 62a in the example above, the data is shifted in parallel to the following PIPO shift registers in shift register assembly 66. The print data is moved in parallel up assembly 66 one shift register at a time every serial load, until the print data reaches the last register, where it is applied to LED driver circuit $54_1$ (See U.S. patent application Ser. No. 12/232,220, filed on Sep. 12, 2008). Applying the foregoing embodiment to the process direction profile of FIG. 3B, the process direction profile is reduced by approximately 76% to 21 μm for 1200 dpi×1200 dpi and by approximately 88% to 10.4 μm for 1200 dpi×2400 dpi. The "line" compensated process direction profiles versus the chip averaged process direction profile are shown in FIG. 5.

The second embodiment of the present apparatus includes a new LED matrix driver modified to further reduce the process direction profile to ⅛th of the resolution of a scan line, i.e., an eight times (8×) improvement in resolution compared with known device resolutions, while causing virtually no change to print controller processing overhead. In this embodiment, combinations 80a through 80h each include eight SIPO shift registers 82, as opposed to one SIPO shift register and seven PIPO shift registers, while at the same time adding additional "line" compensation register 84 and "sub-line" compensation register 86. In this example, "line" compensation register 84 provides a 3-bit binary value including a most significant bit (MSB) and a least significant bit (LSB) to "line" compensation decoder 88, which in turn decodes the binary value and outputs logical values for $L_0$, $L_2$, $L_1$, $L_3$, $L_4$, $L_5$, $L_6$ and $L_7$. Similarly, "sub-line" compensation register 86 provides a 3-bit binary value including a most significant bit (MSB) and a least significant bit (LSB) to "sub-line" compensation decoder 90, which in turn decodes the binary value and outputs logical values for $SL_0$, $SL_2$, $SL_1$, $SL_3$, $SL_4$, $SL_5$, $SL_6$ and $SL_7$. Again, it should be appreciated that more or less than eight shift register combinations may be used based on the number of lines of compensation which are needed, e.g., ten shift register combinations provides ten lines of compensation, and that more or less than eight SIPOs may be included in each combination depending on how many LEDs form an LED chip, e.g., if each LED chip is formed from ten LEDs then ten SIPOs within each combination will be needed, and such variations are within the spirit and scope of the claims.

The print data is applied in parallel to all SIPOs 82 of all combinations 80a through 80h but is only loaded into one of the SIPOs 82 based on the value of "line" compensation register 84 and "sub-line" compensation register 86. In other words, as shift register assembly 92 receives an input from "line" compensation register 84 and "sub-line" compensation register 86 in accordance with Tables 2 and 3 below, the respective SIPO shift register associated with desired amount of compensation is enabled, thereby permitting the receipt of print data therein. For example, if 0 and ⅘ths scan-lines of compensation are needed, $L_0$ is set to 1, $L_1$, $L_2$, $L_3$, $L_4$, $L_5$, $L_6$ and $L_7$ are set to 0, $SL_4$ is set to 1, $SL_0$, $SL_1$, $SL_2$, $SL_3$, $SL_5$, $SL_6$ and $SL_7$ are set to 0 thereby enabling serial data input (DI_S) of the SIPO shift register associated with $L_0$ and $SL_4$, i.e., SIPO shift register 82a. As print data is applied in parallel to all SIPO shift registers via line DI, the print data is only received by the enable SIPO shift register. Simultaneously, all SIPO shift registers including and located above the enabled SIPO shift register have their respective parallel data inputs (DI_P) enabled, thereby permitting the parallel transfer of print data through shift register assembly 92 towards the parallel data output (DO_P) of the upper most SIPO shift register, i.e., SIPO shift register 82e. In the embodiment shown in FIGS. 6A-1 and 6A-2, the simultaneous enablement of the parallel data inputs occurs due to the arrangement of OR gates 94a through 94i and AND gates 96a through 96h. For example, when 0 and ⅘ths scan-lines of compensation are needed, OR gates 94e through 94i each output a 1 as each OR gate receives an input of 1 from at least one of OR gates 94e through 94h and/or AND gates 96d. Hence, all shift registers including and above SIPO shift register 82a are parallel enabled by the outputs of OR gates 94e through 94i. Load line (L) is connected to load data input (LD) of each SIPO shift register in shift register assembly 92. As the load line receives a rising signal, or is pulsed high, data is output from the enabled shift registers, while as the load line receives a falling signal, or is pulsed low, data is loaded into the enabled shift registers. It should be appreciated that the terms "above" and "upper most" are relative terms used with respect to FIGS. 6A-1 and 6A-2 and that the actual orientation of shift register assembly 92 may be different, e.g., horizontally arranged. Clock line CL receives a clock signal which is thereby provided to each of the SIPO shift registers, and causes print data in the serially enabled SIPO shift register to transfer out of that shift register via the serial data output (DO_S) to the serial data output line ($DO_s$). The serial data output line is arranged to pass print data from the shift register assembly of one LED chip to the shift register assembly of the next LED chip in sequence.

As described above, the print data is applied in parallel but the additional "line" compensation register 84 and "sub-line" compensation register 86 selects the appropriate shift register to enable and thereby permit loading. Based on the values provided by "line" compensation register 84 and "sub-line" compensation register 86, as shown in Tables 2 and 3 below, in combination with the logic gate arrangement shown in FIGS. 6A-1 and 6A-2, the print data is received by the appropriate SIPO shift register. For example, if 0 and ⅘th lines of compensation is necessary, the print data is loaded into SIPO shift register 82a.

TABLE 2

Line Comp. Register MSB→LSB

| L(N) | | $L_0$ | $L_1$ | $L_2$ | $L_3$ | $L_4$ | $L_5$ | $L_6$ | $L_7$ |
|---|---|---|---|---|---|---|---|---|---|
| 000 | 0 | 1 | 0 | 0 | 0 | 0 | 0 | 0 | 0 |
| 001 | 1 | 0 | 1 | 0 | 0 | 0 | 0 | 0 | 0 |
| 010 | 2 | 0 | 0 | 1 | 0 | 0 | 0 | 0 | 0 |
| 011 | 3 | 0 | 0 | 0 | 1 | 0 | 0 | 0 | 0 |
| 100 | 4 | 0 | 0 | 0 | 0 | 1 | 0 | 0 | 0 |
| 101 | 5 | 0 | 0 | 0 | 0 | 0 | 1 | 0 | 0 |
| 110 | 6 | 0 | 0 | 0 | 0 | 0 | 0 | 1 | 0 |
| 111 | 7 | 0 | 0 | 0 | 0 | 0 | 0 | 0 | 1 |

TABLE 3

Sub-Line Comp. Register MSB→LSB

| SL(N) | | $SL_0$ | $SL_1$ | $SL_2$ | $SL_3$ | $SL_4$ | $SL_5$ | $SL_6$ | $SL_7$ |
|---|---|---|---|---|---|---|---|---|---|
| 000 | 0 | 1 | 0 | 0 | 0 | 0 | 0 | 0 | 0 |
| 001 | 1 | 0 | 1 | 0 | 0 | 0 | 0 | 0 | 0 |
| 010 | 2 | 0 | 0 | 1 | 0 | 0 | 0 | 0 | 0 |
| 011 | 3 | 0 | 0 | 0 | 1 | 0 | 0 | 0 | 0 |
| 100 | 4 | 0 | 0 | 0 | 0 | 1 | 0 | 0 | 0 |
| 101 | 5 | 0 | 0 | 0 | 0 | 0 | 1 | 0 | 0 |
| 110 | 6 | 0 | 0 | 0 | 0 | 0 | 0 | 1 | 0 |
| 111 | 7 | 0 | 0 | 0 | 0 | 0 | 0 | 0 | 1 |

Figure 7:
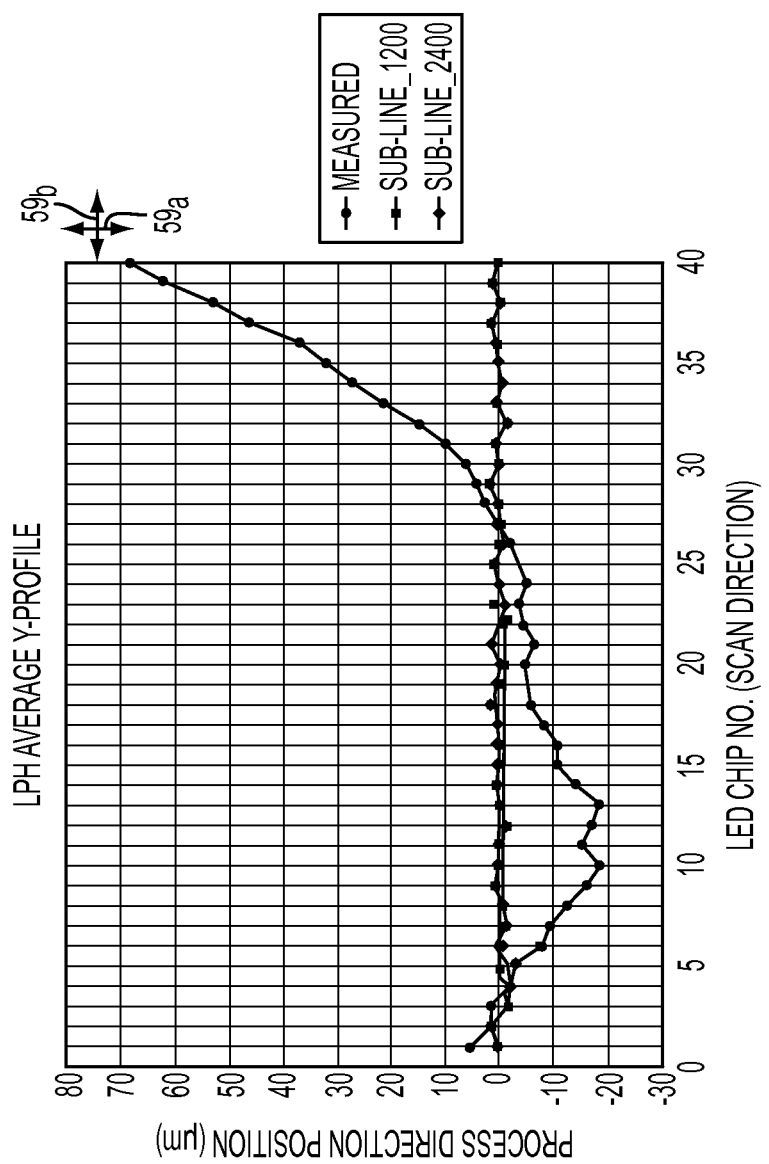
FIG. 7 is a graph depicting a typical chip averaged process direction profile of an LED print-head, a line and sub-line compensated chip averaged process direction profile of a 1200 dpi LED print-head, and a line and sub-line compensated chip averaged process direction profile of a 2400 dpi LED print-head; and, FIG. 8 is a block diagram depicting a present method for quantifying a process direction profile for a light emitting diode print head.

In this embodiment, the correction data is in the form of two integers, where the first integer represents the full line correction value and the second integer represents the fractional line correction value. For example, a correction of 0 and ⅘th would result in a value of 000 being stored in "line" compensation register 84 and a value of 100 being stored in the "sub-line" compensation register 86. The print data then moves in parallel up the shift register chain to the LED driver circuit just as described above. In other words, every time print data is written to the appropriate SIPO shift register, i.e., the shift register corresponding to the necessary correction value, the previous print data shifts up one eighth of a line, i.e., one SIPO shift register, until all print data passes from SIPO shift register 82e to LED driver chip 54$_1$. This embodiment further reduces the compensation range from one scan-line to ⅛th of a scan-line, i.e., approximately 2.6 µm for 1200 dpi× 1200 dpi and approximately 1.3 µm for 1200 dpi×2400 dpi. The "sub-line" compensated process direction profiles versus the chip averaged process direction profile are shown in FIG. 7.

Figures 1, 6A:
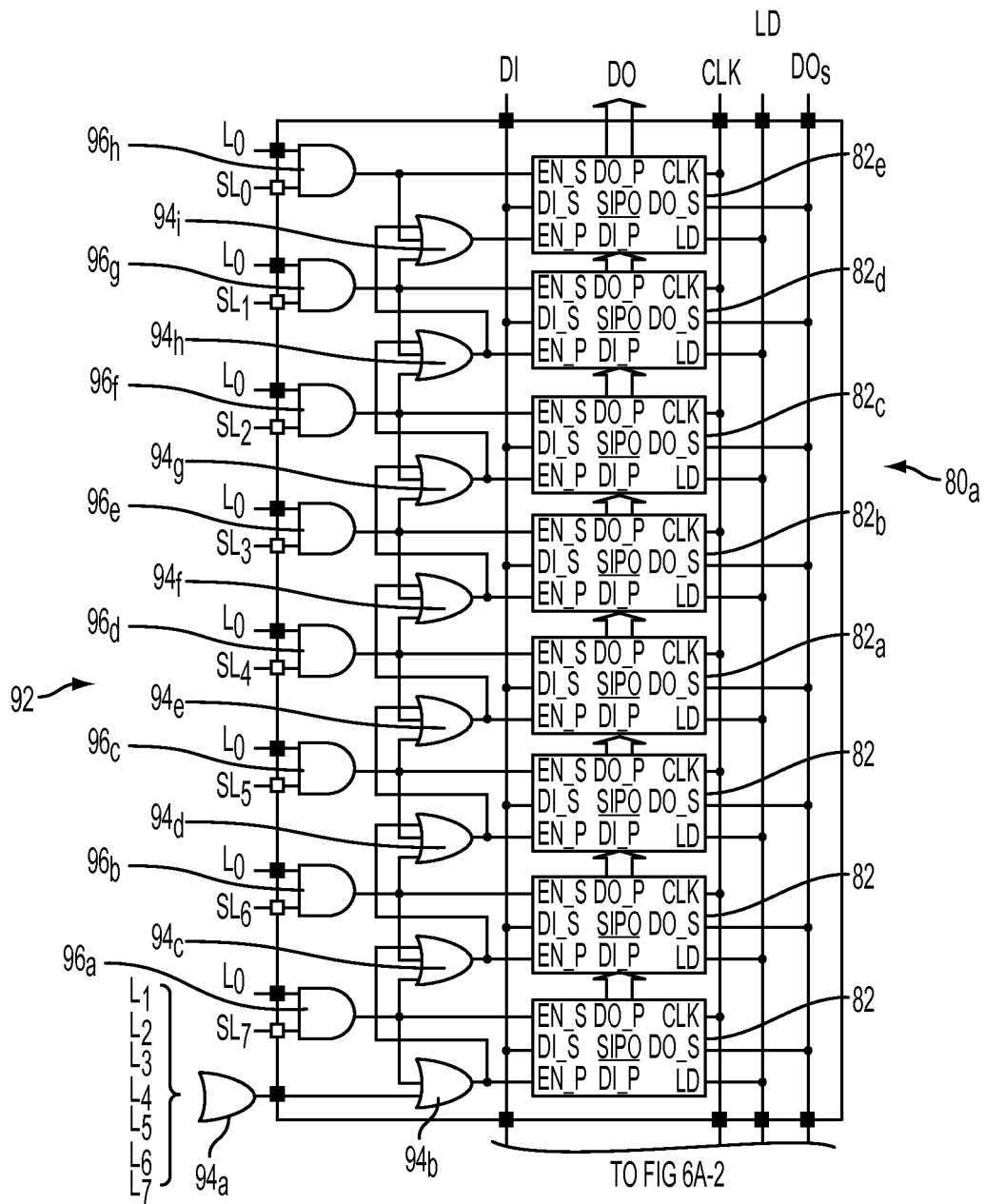
Figures 2, 6A:
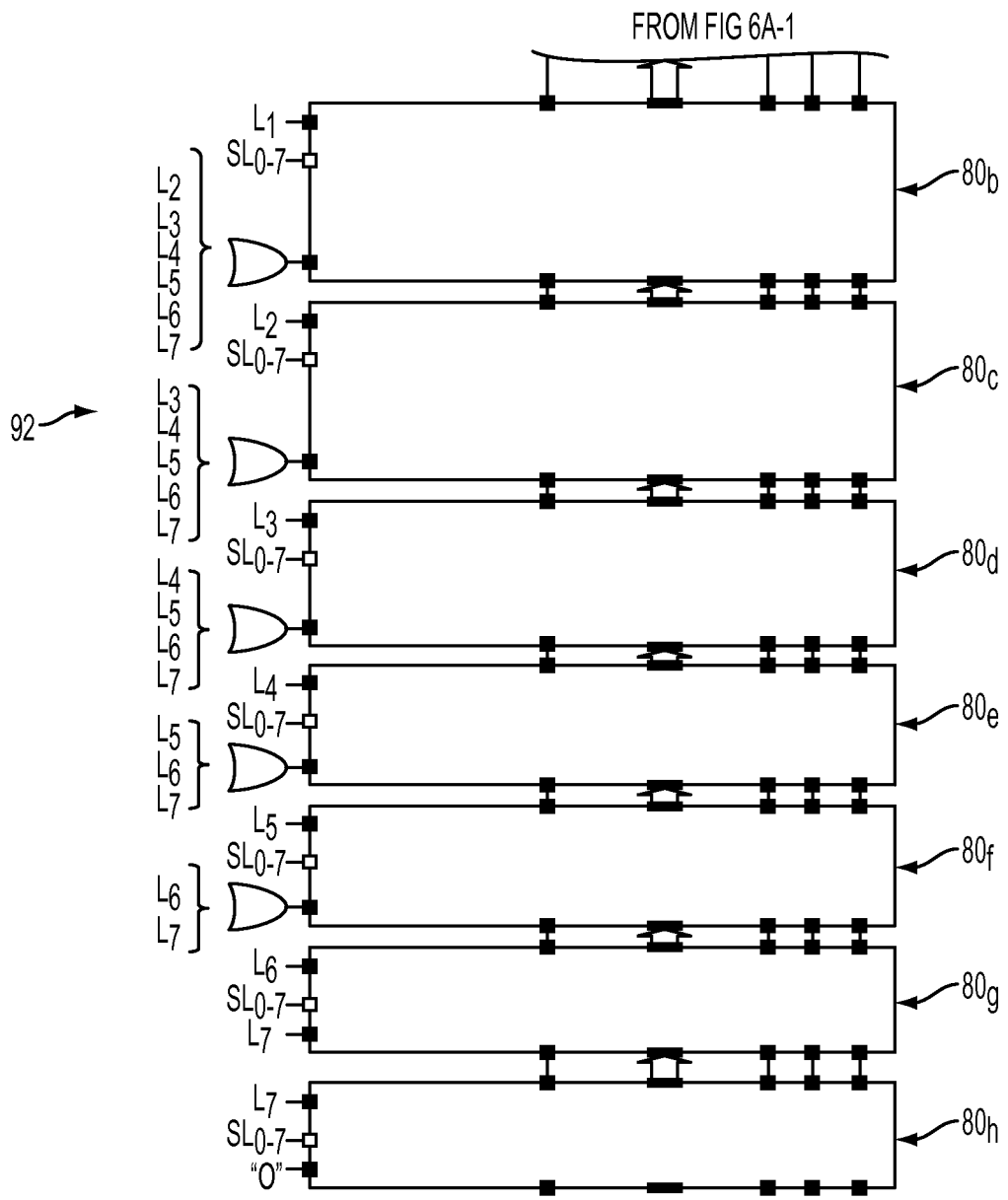
Figure 6B:
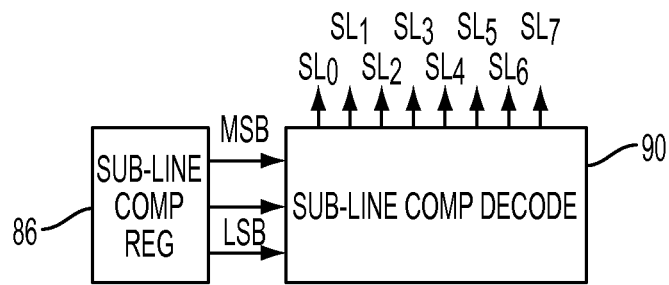
FIG. 6B is an embodiment of a sub-line compensation register.
Figure 6C:
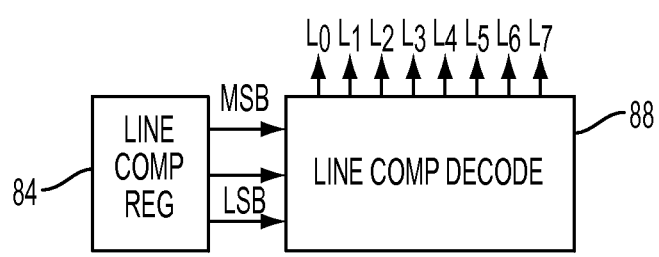
FIG. 6C is an embodiment of a line compensation register.

It should be appreciated that the embodiment of the logic gates shown in FIGS. 6A-1 and 6A-2 are but one arrangement of logic gates capable of enabling the necessary shift registers. The foregoing example of 0 and ⅘ths line compensation is now further explained in view of the arrangement shown in FIGS. 6A-1 and 6A-2. As described above, when 0 and ⅘ths line compensation are needed, $L_0$ and $SL_4$ are set to 1 with all other $L_x$s and $SL_x$s are set to 0. As all inputs to OR gate 94a are set to 0, OR gate 94a outputs a 0. Similarly, as AND gates 96a, 96b, 96c, 96e, 96f, 96g and 96h have inputs of 1 and 0, each of AND gates 96a, 96b, 96c, 96e, 96f, 96g and 96h outputs a 0. AND gate 96d, which receives two inputs of 1, i.e., $L_0$ and $SL_4$, outputs a 1, and thus, SIPO shift register 82a receives a 1 at EN_S. Additionally, the output from AND gate 96d is provided to OR gate 94e thereby causing OR gate 94e to output a 1, and thus, SIPO shift register 82a receives a 1 at EN_P. Each of OR gates 94f through 94i receives a 1 from an AND gate, in this example AND gate 96d, and/or receives a 1 from the previous OR gate in sequence, in this example, OR gate 94f receives a 1 from OR gate 94e, OR gate 94g receives a 1 from OR gate 94f, OR gate 94h receives a 1 from OR gate 94g and OR gate 94i receives a 1 from OR gate 94h, and thus, SIPO shift registers 82a through 82e receive a 1 at each respective EN_P. It should be appreciated that each combination 80a through 80h in assembly 92 includes a similar logic gate arrangement.

Figure 8:
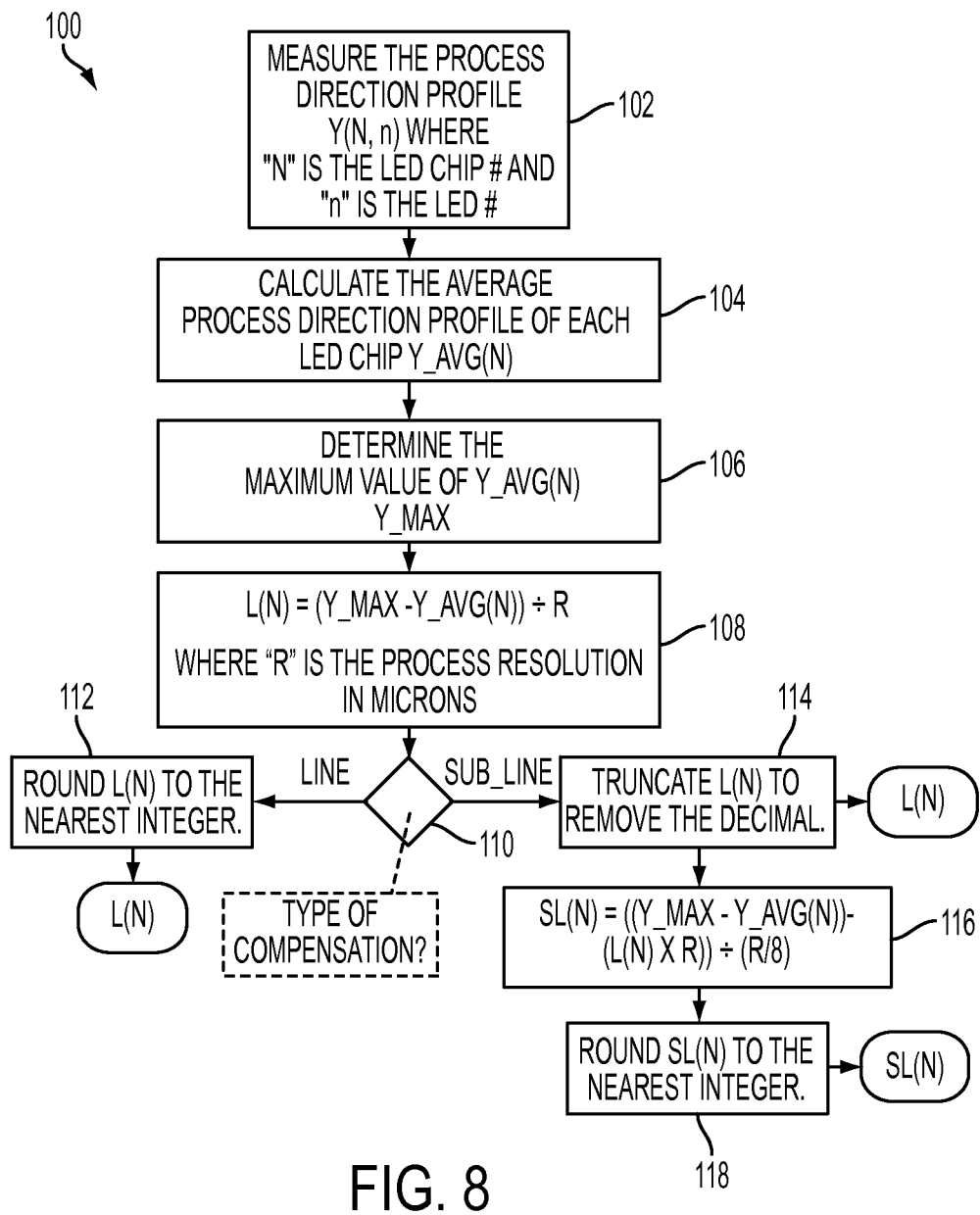

Both embodiments require the application of an algorithm to determine the "line" and "sub-line" compensation values of each chip "N", i.e., L(N) and SL(N). Such an algorithm is shown in FIG. 8, and is typically performed at the time of manufacturing the LPH. Algorithm 100 is based on the calculation of the average process direction position for each LED chip, i.e., Y_AVG(N). First, the process direction profile of the entire LPH is measured, i.e., Y(N,n), where "N" is the LED chip number with the LPH, e.g., LED chip numbers 1 through 40, and "n" is the LED number within each respective LED chip, e.g., LED number 1 through 384 (See Step 102). Next, Y_AVG(N) is calculated for each respective LED chip, where such average value is the average process direction position for all LEDs with a respective LED chip, e.g., LEDs 1 through 384 of LED chip number 1 (See Step 104). Then, the most positive or maximum value of Y_AVG(N) within the LPH is determined for later use as the reference, i.e., zero, position (See Step 106). It should be appreciated that the most positive position is chosen as the reference position because it is more convenient to add a delay to all print data sent to each respective LED chip as opposed to increasing the speed by which data is sent the LED chips. In other words, each respective LED chip is delayed to coincide with the most positive LED chip. Next, the algorithm determines the amount of delay or offset that needs to be applied to the print data for each LED chip relative to the reference position in order to align the print data for an entire scan-line. In other words, the difference between the Y_AVG(N) value of a particular LED chip is subtracted from the Y_MAX value, and the resulting value is then divided by process direction resolution in microns (See Step 108). For example, if the process direction resolution is 1200 dpi then that is equivalent to 21.1667 microns per dot (mpd), or microns for short, as there are 25,400 microns per inch. Thus, the difference between Y_AVG(N) and Y_MAX, a value having units of microns in this example, is divided by 21.1667 mpd. Similarly, if the process direction resolution is 2400 dpi then that is equivalent to 10.5831 microns per dot (mpd), as there are 25,400 microns per inch. Thus, the difference between Y_AVG(N) and Y_MAX, a value having units of microns in this example, is divided by 10.5831 mpd.

Next, based on whether "line" compensation is used or "sub-line" compensation is desired, algorithm 100 results in the calculation of the amount of delay in scan-lines for "line" compensation, i.e., L(N), or alternatively, the amount of delay in scan-lines for "sub-line" compensation, i.e., L(N) and SL(N) (See Step 110). For "line" compensation, L(N) is rounded to the nearest integer (See Step 112), while for "sub-line" compensation, L(N) is truncated to remove any fractional portion of a scan-line (See Step 114). Subsequently, SL(N) is calculated by taking the difference between Y_MAX and Y_AVG(N), multiplying L(N) by the process direction resolution in microns, dividing that value by ⅛ of the process direction resolution and lastly taking the difference between the first difference and the second calculated value (See Steps 116 and 118). Algorithm 100 was applied to the chip averaged process direction profile shown in FIG. 3B, and the results are shown in Table 4 below.

TABLE 4

| Compensation Resolution | | Line 1200 | | Sub-Line 1200 | | | Line 2400 | | Sub-Line 2400 | | |
|---|---|---|---|---|---|---|---|---|---|---|---|
| Chip # | Y_avg | L(N) | Y(N) | L(N) | SL(N) | Y(N) | L(N) | Y(N) | L(N) | SL(N) | Y(N) |
| 1 | 5.15 | 3 | 0.08 | 3 | 0 | 0.08 | 6 | 0.08 | 6 | 0 | 0.08 |
| 2 | 1.65 | 3 | 3.58 | 3 | 1 | 0.94 | 6 | 3.58 | 6 | 3 | −0.39 |
| 3 | 1.24 | 3 | 3.99 | 3 | 2 | −1.30 | 6 | 3.99 | 6 | 3 | 0.02 |
| 4 | −2.26 | 3 | 7.49 | 3 | 3 | −0.44 | 7 | −3.09 | 6 | 6 | −0.44 |
| 5 | −2.57 | 3 | 7.80 | 3 | 3 | −0.14 | 7 | −2.78 | 6 | 6 | −0.14 |
| 6 | −7.62 | 4 | −8.32 | 3 | 5 | −0.38 | 7 | 2.26 | 7 | 2 | −0.38 |
| 7 | −9.50 | 4 | −6.44 | 3 | 6 | −1.15 | 7 | 4.14 | 7 | 3 | 0.17 |
| 8 | −12.76 | 4 | −3.17 | 3 | 7 | −0.53 | 8 | −3.17 | 7 | 6 | −0.53 |
| 9 | −16.62 | 4 | 0.68 | 4 | 0 | 0.68 | 8 | 0.68 | 8 | 1 | −0.64 |
| 10 | −18.98 | 4 | 3.04 | 4 | 1 | 0.40 | 8 | 3.04 | 8 | 2 | 0.40 |
| 11 | −15.83 | 4 | −0.11 | 3 | 8 | −0.11 | 8 | −0.11 | 7 | 8 | −0.11 |
| 12 | −17.44 | 4 | 1.50 | 4 | 1 | −1.14 | 8 | 1.50 | 8 | 1 | 0.18 |
| 13 | −18.63 | 4 | 2.69 | 4 | 1 | 0.05 | 8 | 2.69 | 8 | 2 | 0.05 |
| 14 | −13.91 | 4 | −2.03 | 3 | 7 | 0.62 | 8 | −2.03 | 7 | 6 | 0.62 |
| 15 | −11.00 | 4 | −4.93 | 3 | 6 | 0.36 | 8 | −4.93 | 7 | 4 | 0.36 |
| 16 | −10.77 | 4 | −5.17 | 3 | 6 | 0.12 | 8 | −5.17 | 7 | 4 | 0.12 |
| 17 | −8.36 | 4 | −7.58 | 3 | 5 | 0.36 | 7 | 3.01 | 7 | 2 | 0.36 |
| 18 | −6.22 | 4 | −9.72 | 3 | 4 | 0.87 | 7 | 0.87 | 7 | 1 | −0.46 |
| 19 | −5.35 | 3 | 10.58 | 3 | 4 | 0.00 | 7 | 0.00 | 6 | 8 | 0.00 |
| 20 | −4.82 | 3 | 10.05 | 3 | 4 | −0.53 | 7 | −0.53 | 6 | 8 | −0.53 |
| 21 | −6.75 | 4 | −9.18 | 3 | 5 | −1.25 | 7 | 1.40 | 7 | 1 | 0.08 |
| 22 | −4.62 | 3 | 9.85 | 3 | 4 | −0.73 | 7 | −0.73 | 6 | 7 | 0.59 |
| 23 | −3.95 | 3 | 9.18 | 3 | 3 | 1.24 | 7 | −1.40 | 6 | 7 | −0.08 |
| 24 | −5.05 | 3 | 10.28 | 3 | 4 | −0.31 | 7 | −0.31 | 6 | 8 | −0.31 |
| 25 | −3.75 | 3 | 8.98 | 3 | 3 | 1.04 | 7 | −1.60 | 6 | 7 | −0.28 |
| 26 | −2.45 | 3 | 7.68 | 3 | 3 | −0.26 | 7 | −2.91 | 6 | 6 | −0.26 |
| 27 | 0.09 | 3 | 5.14 | 3 | 2 | −0.15 | 6 | 5.14 | 6 | 4 | −0.15 |
| 28 | 2.76 | 3 | 2.47 | 3 | 1 | −0.17 | 6 | 2.47 | 6 | 2 | −0.17 |
| 29 | 3.92 | 3 | 1.31 | 3 | 0 | 1.31 | 6 | 1.31 | 6 | 1 | −0.01 |
| 30 | 5.86 | 3 | −0.63 | 2 | 8 | −0.63 | 6 | −0.63 | 5 | 8 | −0.63 |
| 31 | 9.78 | 3 | −4.55 | 2 | 6 | 0.75 | 6 | −4.55 | 5 | 5 | −0.58 |
| 32 | 14.47 | 3 | −9.24 | 2 | 5 | −1.30 | 5 | 1.34 | 5 | 1 | 0.02 |
| 33 | 20.76 | 2 | 5.63 | 2 | 2 | 0.34 | 5 | −4.95 | 4 | 4 | 0.34 |
| 34 | 27.12 | 2 | −0.72 | 1 | 8 | −0.72 | 4 | −0.72 | 3 | 7 | 0.60 |
| 35 | 31.98 | 2 | −5.59 | 1 | 6 | −0.29 | 3 | 5.00 | 3 | 4 | −0.29 |
| 36 | 36.80 | 2 | −10.40 | 1 | 4 | 0.18 | 3 | 0.18 | 3 | 0 | 0.18 |
| 37 | 46.38 | 1 | 1.18 | 1 | 0 | 1.18 | 2 | 1.18 | 2 | 1 | −0.14 |
| 38 | 53.10 | 1 | −5.54 | 0 | 6 | −0.25 | 1 | 5.05 | 1 | 4 | −0.25 |
| 39 | 62.37 | 0 | 6.36 | 0 | 2 | 1.07 | 1 | −4.22 | 0 | 5 | −0.25 |
| 40 | 68.73 | 0 | 0.00 | 0 | 0 | 0.00 | 0 | 0.00 | 0 | 0 | 0.00 |

The determination of L(N) and SL(N), e.g., by performing algorithm 100, is done during final testing of an LED print-head using know testing techniques and common data analysis devices such as a personal computer. For example, discreet LEDs or combinations of LEDs may be illuminated and their respective positions measured using a stereo microscope, and subsequently the position information may be entered or received into a personal computer and analyzed in accordance with the steps described above. The personal computer can include but is not limited to an arithmetic logic unit, a central processing unit, memory, input devices, output devices, etc. The delay data, i.e., line delay data and/or sub-line delay data, is stored in the print-head's nonvolatile memory 200 and then readout and applied to the print-head similar to techniques involving power compensation. If four bits are used for both sets of delay data, only 40 additional bytes of memory are required to be loaded into the print-head prior to a print job. This represents less than 0.4% of the total compensation memory of a typical print-head.

An LED driver chip with configurable print delay that compensates for the process direction profile of an LED print-head has been set forth herein. The LED driver chip provides electronic correction for process direction position errors of LED chips within LED print heads. This correction is implemented by the present LED driver chips, which are integrated within the print head. The present LED driver chip can either correct to the nearest scan line, i.e., nearest process direction pixel position, or correct to within ⅛ of a scan line, assuming there is 1:8 multiplexed drive of the LEDs. Such correction is applied per LED array chip, or in other words, each discreet LED within an LED array chip is corrected by the same amount. The two embodiments set forth above expand the use of the existing compensation memory of a print-head to provide additional information to the LED driver chips, enabling them to perform "line" and "sub-line" process direction profile compensation, respectively. "Line" compensation reduces the effective process direction profile to less than or equal to one scan-line, the same as with print controller based compensation but without the processor overhead.

"Sub-line" compensation further reduces the effective process direction profile of the print-head to ⅛th of the process direction resolution, which is an additional eight times (8×) improvement, also without adding print controller processor overhead. Furthermore, a method to calculate the necessary "line" and "sub-line" compensation values used by the foregoing embodiments is also set forth herein. The foregoing process direction profile correction of LED print heads improves image quality. The value of sub-line correction decreases as the process direction resolution increases, but is still of value. Correcting process direction profile errors within LED print heads removes a processor intensive task from the print controller, and is the only feasible option for implementing sub-line correction.

It will be appreciated that various of the above-disclosed and other features and functions, or alternatives thereof, may be desirably combined into many other different systems or applications. Various presently unforeseen or unanticipated alternatives, modifications, variations or improvements therein may be subsequently made by those skilled in the art which are also intended to be encompassed by the following claims.

What is claimed is:

1. A light emitting diode (LED) print head arranged to receive a set of raw print data, the print head comprising:
    a plurality of LED array chips each comprising a plurality of LEDs, wherein each LED of the plurality of LEDs comprises a process direction position;
    at least one matrix driver circuit arranged to control activation of the plurality of LEDs in response to the set of raw print data;
    at least one real-time print data compensation circuit comprising:
        a line compensation register comprising a delay value based on an average process direction position of the associated respective LED array chip;
        at least two serial-in-parallel-out (SIPO) shift registers; and,
        at least two logical OR gates, wherein a first logical OR gate of the at least two logical OR gates receives inputs from the line compensation register, a second logical OR gate of the at least two logical OR gates receives inputs from the line compensation register and the first logical OR gate, and wherein one of the at least two SIPO shift registers is serial enabled by the delay value, and the at least two SIPO shift registers are parallel enabled by the delay value or an output from the second logical OR gate,
    wherein the at least one real-time print data compensation circuit receives the set of raw print data and delays transmitting the set of raw print data to the at least one matrix drive circuit based on a relative relationship between the process direction position of each LED, wherein each of the plurality of LED array chips comprises the average process direction position calculated from an average of each process direction position of the plurality of LEDs which form a respective LED array chip, and the at least one real-time print data compensation circuit delays transmitting the set of raw print data to the at least one matrix drive circuit based on a relative relationship between the average process direction position of each LED array chip.

2. The LED print head of claim 1 wherein each LED array chip comprises a plurality of subgroups of LEDs and the at least one matrix drive circuit comprises a plurality of matrix drive circuits each associated with one of the plurality of subgroups of LEDs.

3. The LED print head of claim 2 wherein the at least one real-time print data compensation circuit comprises a plurality of real-time print data compensation circuits each associated with one of the plurality of matrix drive circuits.

4. The LED print head of claim 3 wherein each of the plurality of LED array chips comprises an average process direction position calculated from an average of each process direction position of the plurality of LEDs which form a respective LED array chip, and the plurality of real-time print data compensation circuits delay transmitting the set of raw print data to the plurality of matrix drive circuits based on relative relationships between the average process direction position of each LED array chip.

5. The LED print head of claim 4 wherein each of the plurality of real-time print data compensation circuits comprises:
    a line compensation register comprising a delay value based on the average process direction position of the associated respective LED array chip;
    at least two serial-in-parallel-out (SIPO) shift registers; and,
    at least two logical OR gates, wherein a first logical OR gate of the at least two logical OR gates receives inputs from the line compensation register, a second logical OR gate of the at least two logical OR gates receives inputs from the line compensation register and the first logical OR gate, and wherein one of the at least two SIPO shift registers is serial enabled by the delay value and the at least two SIPO shift registers are parallel enabled by the delay value or an output from the second logical OR gate.

6. A light emitting diode (LED) print head arranged to receive a set of raw print data, the print head comprising:
    a plurality of LED array chips each comprising a plurality of LEDs, wherein each LED of the plurality of LEDs comprises a process direction position;
    at least one matrix driver circuit arranged to control activation of the plurality of LEDs in response to the set of raw print data;
    at least one real-time print data compensation circuit comprising:
        a line compensation register comprising a delay value based on an average process direction position of the associated respective LED array chip;
        at least two serial-in-parallel-out (SIPO) shift registers;
        at least one parallel-in-parallel-out (PIPO) shift registers; and,
        at least two logical OR gates, wherein a first logical OR gate of the at least two logical OR gates receives inputs from the line compensation register, a second logical OR gate of the at least two logical OR gates receives inputs from the line compensation register and the first logical OR gate, and wherein one of the at least two SIPO shift registers is serial enabled by the delay value, the at least two SIPO shift registers are parallel enabled by the delay value or an output from the second logical OR gate, the at least one PIPO shift register is parallel enabled by an output from the first logical OR gate, and the at least one PIPO shift register receives the raw print data from a parallel output of a first SIPO shift register of the at least two SIPO shift registers and outputs the raw print data to a parallel input of the second SIPO shift register of the at least two SIPO shift registers,
    wherein the at least one real-time print data compensation circuit receives the set of raw print data and delays transmitting the set of raw print data to the at least one matrix drive circuit based on a relative relationship between the process direction position of each LED, wherein each of the plurality of LED array chips comprises the average process direction position calculated from an average of each process direction position of the plurality of LEDs which form a respective LED array chip, and the at least one real-time print data compensation circuit delays transmitting the set of raw print data to the at least one matrix drive circuit based on a relative relationship between the average process direction position of each LED array chip.

7. The LED print head of claim 6 wherein each LED array chip comprises a plurality of subgroups of LEDs and the at least one matrix drive circuit comprises a plurality of matrix drive circuits each associated with one of the plurality of subgroups of LEDs.

8. The LED print head of claim 7 wherein the at least one real-time print data compensation circuit comprises a plurality of real-time print data compensation circuits each associated with one of the plurality of matrix drive circuits.

9. The LED print head of claim 8 wherein each of the plurality of LED array chips comprises an average process direction position calculated from an average of each process direction position of the plurality of LEDs which form a respective LED array chip, and the plurality of real-time print data compensation circuits delay transmitting the set of raw print data to the plurality of matrix drive circuits based on relative relationships between the average process direction position of each LED array chip.

10. The LED print head of claim 9 wherein each of the plurality of real-time print data compensation circuits comprises:

a line compensation register comprising a delay value based on the average process direction position of the associated respective LED array chip;

at least two serial-in-parallel-out (SIPO) shift registers;

at least one parallel-in-parallel-out (PIPO) shift registers; and, at least two logical OR gates, wherein a first logical OR gate of the at least two logical OR gates receives inputs from the line compensation register, a second logical OR gate of the at least two logical OR gates receives inputs from the line compensation register and the first logical OR gate, and wherein one of the at least two SIPO shift registers is serial enabled by the delay value, the at least two SIPO shift registers are parallel enabled by the delay value or an output from the second logical OR gate, the at least one PIPO shift register is parallel enabled by an output from the first logical OR gate, and the at least one PIPO shift register receives the raw print data from a parallel output of a first SIPO shift register of the at least two SIPO shift registers and outputs the raw print data to a parallel input of the second SIPO shift register of the at least two SIPO shift registers.

* * * * *